June 30, 1959    B. H. THURMAN    2,892,619
PIPE LINE MIXER
Filed July 1, 1957

INVENTOR.
BENJAMIN H. THURMAN

BY HIS ATTORNEYS.
HARRIS, KIECH, FOSTER & HARRIS

United States Patent Office 2,892,619
Patented June 30, 1959

2,892,619

PIPE LINE MIXER

Benjamin H. Thurman, New York, N.Y., assignor to Benjamin Clayton, doing business under the fictitious name and style of Refining, Unincorporated Application July 1, 1957, Serial No. 669,265

4 Claims. (Cl. 259—7)

This invention relates to a pipe line mixer which may be used for intimately mixing two or more components of a fluid stream which passes through the mixer.

In many continuous fluid operations, a quantity of one fluid is added at a controlled rate to a stream of a second fluid and it is desired to intimately mix the two fluids prior to the next step in the operation. Accordingly, it is an object of the invention to provide a mixer which will intimately and uniformly mix two or more components of a fluid stream which passes through the mixer. Another object of the invention is to provide such a mixer which will provide intimate mixing when one of the components is present in very small quantities, such as in the order of 0.5%. A further object of the invention is to provide such a mixer which is small, compact, efficient and extremely rapid yet which has a large capacity and a high flow rate. For example, one embodiment of the invention having moving parts of the order of four inches in diameter and four inches long will handle as high as 250,000 pounds of fluid per day.

It is another object of the invention to provide a pipe line mixer having a cage which is fixed within a chamber through which the fluid to be mixed passes, the cage having a plurality of openings in the sides thereof, the fluid flowing in the end of the cage and out through the side openings, there being a rotating impeller positioned within the cage carrying blades which sweep past the side openings of the cage. A further object of the invention is to provide such a mixer in which the cage is composed of a plurality of bars circularly disposed with spaced openings therebetween providing fluid flow paths which are disposed at an angle to the radii of the circle. Another object of the invention is to provide such a cage having substantially diamond-shaped bars with one surface of each bar closely spaced to the rotating impeller blades.

It is another object of the invention to provide a pipe line mixer having a cage and impeller positioned within a chamber having inlet and outlet sections, with a main flow path through the inlet section, an end of the cage, the side of the cage and the outlet section, and a recirculation path from the outlet section respectively through the end and side of the cage. Another object of the invention is to provide such a pipe line mixer including means for adjusting the magnitude of the circulation flow. Another object of the invention is to provide such a mixer having a movable flange carried on the cage for engaging a portion of the chamber structure to close off the recirculation path.

It is a further object of the invention to provide a pipe line mixer with a rotatable impeller positioned within an apertured cage for intimately mixing fluids flowing under pressure through the cage with the impeller being operated at high rotational velocities, such as in the order of three to four thousand revolutions per minute.

The invention also comprises novel details of construction and novel combinations and arrangements of parts, which will more fully appear in the course of the following description. The drawing merely shows and the description merely describes a preferred embodiment of the present invention which is given by way of illustration or example.

Figure 1:
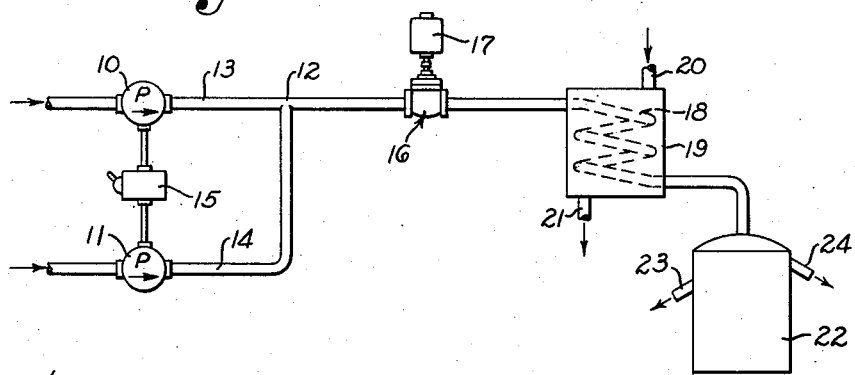
Fig. 1 is a schematic drawing illustrating the use of the pipe line mixer of the invention in the continuous refining of glyceride oils.

The pipe line mixer of the invention may be used for intimately mixing two or more components of any stream of fluid and it is illustrated herein in the continuous refining of glyceride oils, wherein a stream of reagent is continuously added to a stream of crude oil, the reagent being from about 0.5% to 15% of the resultant mixture. In the system of Fig. 1, pumps 10 and 11 continuously supply crude oil and reagent, respectively, to a mixing point or junction 12 through pipes 13 and 14, respectively. Each of the pumps is driven from a control unit 15 which provides control of the pumping rate of each pump. In the example given herein, the reagent may be an alkaline solution used in an amount sufficient to at least partially neutralize the free fatty acids of the crude oil and the proportions of reagent and oil will depend upon the initial character of the crude oil.

The stream flows from the mixing point or junction 12 through a pipe line mixer 16 of the invention where the oil and reagent are rapidly and intimately mixed together, the mixer 16 being driven in rotation by an electric motor 17 directly coupled thereto or by any other suitable means, such as a gear drive or belt drive. The stream of fluid leaving the mixer 16 passes through a coil 18 of a heat exchanger 19, heat being transferred to the stream by suitable means, such as by a heating medium entering the exchanger at pipe 20 and exiting at pipe 21. The heated mixture then passes to a centrifuge 22 wherein it is separated into soap-stock which leaves the centrifuge at pipe 23 and oil which leaves at pipe 24.

Figure 2:
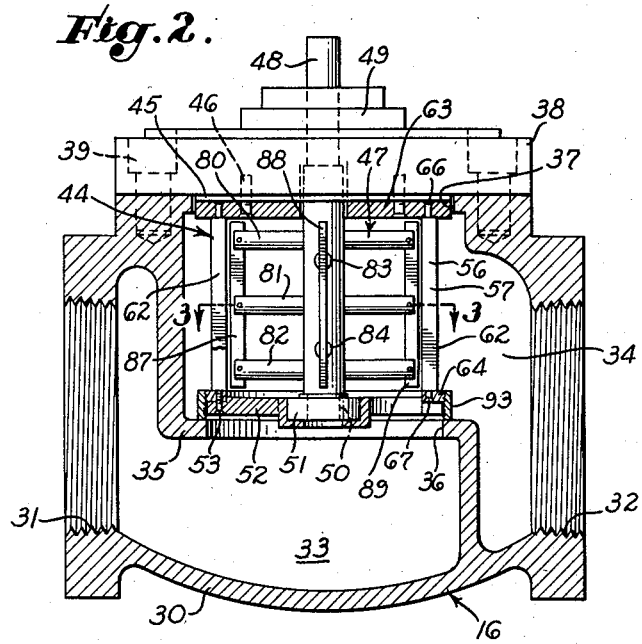
Fig. 2 is an enlarged, partial sectional view of the pipe line mixer of Fig. 1.

The mixer 16 of Fig. 1 is shown in detail in Fig. 2 and includes a body structure 30 having a threaded inlet 31 and a threaded outlet 32 permitting fluid flow through an internal chamber which is divided into an inlet section 33 and an outlet section 34 by a plate or wall 35. An opening 36 is provided in the wall 35 and a similar opening 37 in the outer wall of the body structure 30 is closed by a cover plate 38 fixed to the body structure by suitable means such as screws 39. It should be noted that a conventional valve body can be used for the body structure if desired.

A cage 44 is mounted against a portion 45 of the cover plate 38 by screws 46, the cage being disposed with its free end adjacent the opening 36. An impeller unit 47 is positioned within the cage 44 and has a shaft 48 passing outward through the cage, the cover plate 38 and an oil seal within an oil seal housing 49. The inner end 50 of the shaft 48 is preferably mounted in a bearing 51 carried in a spider 52 fixed to the free end of the cage 44 by screws 53.

Figure 3:
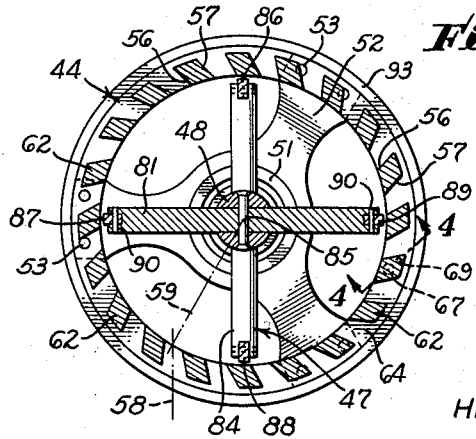
Fig. 3 is an enlarged sectional view taken along the line 3—3 of Fig. 2.

The cage 44 is a figure of revolution, the impeller unit 47 being rotatably positioned within the cage. In the preferred embodiment of the invention illustrated herein, the cage is in the form of a hollow cylinder with a plurality of openings 56 in the side wall thereof. These openings are preferably slot-like in shape, with a length to width ratio in the order of ten to one. They may be skewed but are preferably axial as shown in Fig. 3 and the cross-sectional area of each opening is approximately equal to the cross-sectional area of the said wall section between adjacent openings.

The side wall of the cage 44 is preferably made with a substantial thickness so that the openings 56 in the wall will be in the form of flow paths or channels 57 rather than mere holes in a thin sheet, the length of such channels being preferably at least as great as the width of the slot-like openings. Each of the flow channels 57 is preferably formed with its axis 58 disposed at an angle to the corresponding radius 59 of the cylinder which passes through the opening in the side wall, such angle being in the range of ten to twenty degrees, preferably about fifteen degrees.

Figure 4:
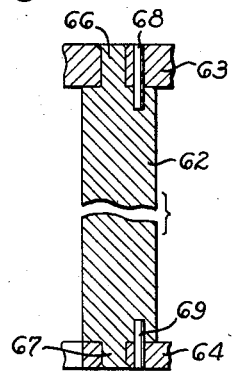
Fig. 4 is an enlarged sectional view taken along the line 4—4 of Fig. 3.
Figure 5:
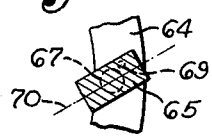
Fig. 5 is a partial view of the cage of the invention showing an intermediate step in a preferred method of forming the cage.
Figure 6:
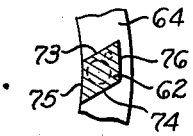
Fig. 6 is a view similar to that of Fig. 5, showing a subsequent step.

Such a cage may be formed from a plurality of bars 62 fixed between end rings 63, 64, the screws 46 passing through the end rings 63 for holding the cage to the cover plate 38 and the screws 53 engaging the end ring 64 for holding the spider 52 to the cage. A method of manufacturing the cage with diamond-shaped bars is shown in Figs. 4, 5, and 6. A plurality of rectangular bars 65 are fixed between the end rings 63, 64 by suitable means, such as by providing extensions 66, 67 at each end respectively of each bar 65, which extensions pass through corresponding openings in the end rings. Pins 68, 69 are inserted through the end rings respectively into the bars for holding the components in position, the extensions 66, 67 being peened over as shown in Fig. 4. The bars 65 are positioned relative to the end rings as shown in Fig. 5 so that the longitudinal axis 70 of the rectangular cross-section of the bar 65 is at the desired angle with the radius of the end ring passing through the center of the bar, such angle being in the range of ten to twenty degrees as previously discussed.

The completely assembled cage is then turned in a lathe, the rectangular bars being machined into substantially diamond-shaped bars having two parallel, flat sides 73, 74 which are joined by curved sides 75, 76, which are arcs of concentric circles, as seen in Fig. 6.

The impeller unit 47 includes cross arms 80, 81, 82, 83, 84 which pass through the shaft 48 and are fixed thereto by suitable means, such as pins 85, the cross arms 80, 81 and 82 being disposed at right angles to the cross arms 83, 84. Blades 86, 87, 88, 89 are fixed in aligned slots in the ends of the cross arms by pins 90, the outer edges of the blades being spaced slightly from the inner wall of the cage 44 to provide clearance when the impeller unit is rotated within the cage.

An annular ring or flange 93 is threadedly mounted on the end ring 64 of the cage 44 so that the flange may be moved axially relative to the cage. When the pipe line mixer of the invention is assembled, the cage 44 may be spaced from the wall 35 of the body structure 30 providing an annular passage between the cage and wall. The flange 93 may be moved relative to the cage to vary the size of this annular passage and may be moved to engage the wall 35 and completely block the annular passage.

In the operation of the pipe line mixer, the fluid to be mixed is pumped in through the inlet section 33 and the impeller unit is driven in rotation by suitable means. The impeller unit may be operated in either direction. However, it is preferred to have it operate clockwise as viewed in Fig. 3. The main fluid flow path through the mixer is from the inlet section 33, through the opening 36 in the wall 35, through the open end ring 64 of the cage, and out of the cage through the openings 56 in the side wall into the outlet section 34. A recirculation path may be provided from the outlet section 34, through the annular passage between the cage and the wall 35, through the open end of the cage, and back to the outlet section through the side openings in the cage. The magnitude of flow through this recirculation path is controlled by the position of the flange 93 at the bottom of the cage.

A pipe line mixer consructed as described above will be compact, rugged, and efficient and will provide intimate and uniform mixing of two components of a fluid stream when one component is present in quantities as low as 0.5% of the total. Such a pipe line mixer is capable of continuous operation at high capacity; for example, a mixer having a cage about four inches high and four inches in diameter with twenty equally spaced bars in the cage and four blades in the impeller with the impeller operating at approximately 3400 revolutions per minute will handle 250,000 pounds of glyceride oil per day.

Although an exemplary embodiment of the invention has been disclosed and discussed, it will be understood that other applications of the invention are possible and that the embodiments disclosed may be subjected to various changes, modifications and substitutions without necessarily departing from the spirit of the invention.

I claim as my invention:

1. In a mixer for insertion in a fluid flow line, the combination of: a body structure having a flow passage therethrough, said body structure including plate means blocking said flow passage and dividing said flow passage into inlet and outlet sections, said plate means having an opening therein; a cage having an open end and a side which is a figure of revolution, said side having a plurality of apertures for fluid flow therethrough; means for mounting said cage within said body structure in said outlet section on one side of said plate means with an annular flow passage between said plate means and cage for fluid flow both from said inlet section through said opening in said plate means into said cage and from said outlet section through said annular passage into said cage, through said open end, and out said apertures into said outlet section; and an impeller rotatably mounted within said cage, said impeller having a plurality of blades disposed adjacent the inner wall of said side of said cage.

2. In a mixer for insertion in a fluid flow line, the combination of: a body structure having a flow passage therethrough, said body structure including plate means blocking said flow passage and dividing said flow passage into inlet and outlet sections, said plate means having an opening therein; a cage having an open end and a side which is a figure of revolution, said side having a plurality of apertures for fluid flow therethrough; means for mounting said cage within said body structure in said outlet section on one side of said plate means with an annular flow passage between said plate means and cage for fluid flow both from said inlet section through said opening in said plate means into said cage and from said outlet section through said annular passage into said cage, through said open end, and out said apertures into said outlet section; means carried on said cage adjacent said plate means for movement relative to said cage and plate means to vary the size of said annular passage; and an impeller rotatably mounted within said cage, said impeller having a plurality of blades disposed adjacent the inner wall of said side of said cage.

3. In a mixer for insertion in a fluid flow line, the combination of: a body structure having a flow passage therethrough, said body structure including plate means blocking said flow passage and dividing said flow passage into inlet and outlet sections, said plate means having an opening therein; a cage comprising a pair of end rings spaced apart by a plurality of uniformly spaced bars, at least one of said end rings being open permitting flow of fluid into said cage, said bars being substantially diamond-shaped in cross-section and positioned with one surface of each of said bars along the surface of a cylinder forming flow paths between said bars which are disposed at an angle to the corresponding radius of said cylinder which enters each flow path, the spaces between said bars at said surface of the cylinder being substantially equal to the areas of said one surface of the bars; means for mounting said cage within said body structure in said outlet section on one side of said plate means with an annular flow passage between said plate means and cage for fluid flow both from said inlet section through said opening in said plate means into said cage and from said outlet section through said annular passage into said cage, through said open end, and out said flow paths into said outlet section; an annular flange mounted on said cage adjacent said one end ring, said flange being movable relative to said cage toward and away from said plate means for engaging said plate means and controlling fluid flow through said annular passage; and an impeller rotatably mounted within said cage, said impeller having a plurality of blades disposed adjacent said surface of said cylinder defined by said bars.

4. In a mixer for insertion in a fluid flow line, the combination of: body means defining a chamber having an inlet section and an outlet section and means defining a flow passage therebetween; a cage having a side which is a figure of revolution, said side having a plurality of apertures therein for fluid flow from the interior to the exterior of said cage, said cage having an inlet opening for fluid flow into the interior thereof; cage support means for mounting said cage within said chamber in said outlet section with said inlet opening of said cage in direct communication with said flow passage between said sections; a bypass between the cage and the chamber in the body means, wholly within said body means, to deliver fluid from the outlet section to said inlet opening; and an impeller rotatably mounted within said cage, said impeller having a plurality of blades disposed adjacent the inner wall of said side of said cage.

References Cited in the file of this patent
UNITED STATES PATENTS

| | | |
|---|---|---|
| 423,285 | Smith et al. | Mar. 11, 1890 |
| 2,142,062 | Thurman | Dec. 27, 1938 |
| 2,461,720 | Cadwood et al. | Feb. 15, 1949 |
| 2,503,228 | Wanner | Apr. 4, 1950 |
| 2,698,303 | Blair et al. | Dec. 28, 1954 |
| 2,767,965 | Daman | Oct. 23, 1956 |